(12) United States Patent
Mochizuki et al.

(10) Patent No.: US 6,715,921 B2
(45) Date of Patent: Apr. 6, 2004

(54) SHAFT BEARING STRUCTURE OF SPINDLE MOTOR

(75) Inventors: Akihiro Mochizuki, Shizuoka (JP); Kazuhiro Matsuo, Fujieda (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 10/263,652

(22) Filed: Oct. 4, 2002

(65) Prior Publication Data

US 2003/0075999 A1 Apr. 24, 2003

(30) Foreign Application Priority Data

Oct. 24, 2001 (JP) .......................................... 2001-326053

(51) Int. Cl.⁷ .............................................. F16C 17/02
(52) U.S. Cl. ...................................................... 384/415
(58) Field of Search ............................. 384/415, 399, 384/400, 397, 398

(56) References Cited

FOREIGN PATENT DOCUMENTS

| JP | 04-107313 | 4/1992 |
| JP | 10-184665 | 7/1998 |
| JP | 3029121 | 2/2000 |

*Primary Examiner*—Lenard A. Footland
(74) *Attorney, Agent, or Firm*—Connolly Bove Lodge & Hutz LLP

(57) ABSTRACT

A shaft bearing structure of spindle motor, which holds a rotor rotationally by a shaft bearing and a bearing holder fixed on a motor base of a stator, the rotor is fixed with a spindle shaft and confronted with the stator, an oil cycle material retains and re-flows lubricating oil circulating around the spindle shaft in the shaft bearing, wherein the oil cycle material is placed in the gap between the inner circumference of the bearing holder and the periphery of the spindle shaft, and placed at least contiguous to one edge of the shaft bearing in axial direction of the spindle shaft.

3 Claims, 7 Drawing Sheets

SHAFT BEARING STRUCTURE OF SPINDLE MOTOR

BACKGROUND OF THE INVENTION

1. Field of the Invention

The present invention relates to a shaft bearing structure of spindle motor capable for a laser beam printer (hereinafter referred to as LBP) or an optical disc drive.

2. Description of the Related Art

A laser beam printer (hereinafter referred to as LBP) is capable of high speed printing, so that the use of such an LBP is increasing especially in business field.

As the recent LBP complies with color printing, a spindle motor for LBP is required to stably rotate in high speed. In other words, the spindle motor for LBP is required to have a shaft bearing which provides stable rotation in high speed.

FIG. 1 is a diagram for explaining a structure and operation of a LBP. In FIG. 1, a LBP "A" is composed of a semiconductor laser driver 100 controlled by an external equipment (such as a computer) 101 through a controller 102 and a DC controller 103, a scanner motor driver 104 controlled by the DC controller 103, a cylindrical lens 105 to pass a laser beam emitted from a semiconductor laser controlled by the semiconductor laser driver 100, a polygon mirror 106 attached to a spindle motor (not shown) of which rotation is controlled by the motor driver 104 by the controller 103 to reflect the laser beam emitted through the cylindrical lens 105, a spherical lens 107 and a toric lens 108 for spreading the laser beam onto a photosensitive unit 109 for printing information onto a sheet of paper not shown, a horizontal synchronizing mirror 110 and a BD lens 111 for monitoring the laser beam through an optical fiber 112 for feedback control.

The polygon mirror 106 has four to six sides and is maintained at the rotational velocity of 20,000 to 30,000 rpm. As the polygon mirror 106 reflects the laser beam onto the photosensitive unit 109, a slight inclination of the polygon mirror 106 (which may be caused by wobbling of rotational axis of the spindle shaft) may not reflect the laser beam properly on the photosensitive unit 109 for scanning.

In this sense, the spindle motor for rotating the polygon mirror 106 should rotate very fast and stable in high-degree of accuracy.

However, the spindle motor used for the LBP has a problem of leakage of lubricating oil in the rotational shaft as it rotate very fast in high revolution. The leakage of lubricating oil of the spindle motor may affect the duration of the motor. Further, the leakage of lubricating oil may damage the inside mechanism of the LBP or spoil the printing paper.

FIG. 2 is a cross sectional view of half-side of a spindle motor. The cross sectional view of the spindle motor is symmetry to the half-side view. The spindle motor is basically composed of a rotor 201 and a stator 202. The rotor 201 has a bush 203 pressed to a spindle shaft 204 and fixed with the polygon mirror 106. The rotor 201 is attached to the spindle shaft 204 and the spindle shaft 204 is rotationally attached to the stator 202 by a shaft bearing 205 and a bearing holder 206.

FIG. 3 is a cross sectional enlarged view of inside portion of the surrounding of the spindle shaft 204 and the bush 203 and the bearing holder 206 and the shaft bearing 205. In FIG. 3, a hydraulic pressure 31 presses lubricating oil 30 by the rotation of the spindle shaft 204 and the lubricating oil 30 moves along the surface of the spindle shaft 204 and comes out on the surface of the bush 203. Then the lubricating oil 30 leaks out from a gap portion 32 formed between the bearing holder 206 and the bush 203.

The height of the spindle motor may be shortened by mechanical design of an LBP, which makes the gap portion 32 narrower. In the case that the gap portion becomes narrower, the lubricating oil 30 tends to leak out even more.

SUMMARY OF THE INVENTION

Accordingly, in consideration of the above mentioned problems of the related art, an object of the present invention is to provide a shaft bearing structure of spindle motor, including, a rotor rotationally attached to a shaft bearing and a bearing holder fixed on a motor base of a stator, wherein the rotor is fixed with a spindle shaft and confronted with the stator, and the shaft bearing structure is characterized in that an oil cycle material (40, 41) retains and re-flows lubricating oil circulating around the spindle shaft in the shaft bearing, wherein the oil cycle material (40, 41) is placed in the gap between the inner circumference of the bearing holder and the periphery of the spindle shaft, and placed at least contiguous to one edge of the shaft bearing in axial direction of the spindle shaft.

Other object and further features of the present invention will be apparent from the following detailed description when read in conjunction with the accompanying drawings.

DETAILED DESCRIPTION OF THE PREFERRED EMBODIMENTS

[First Embodiment]

Figure 4:
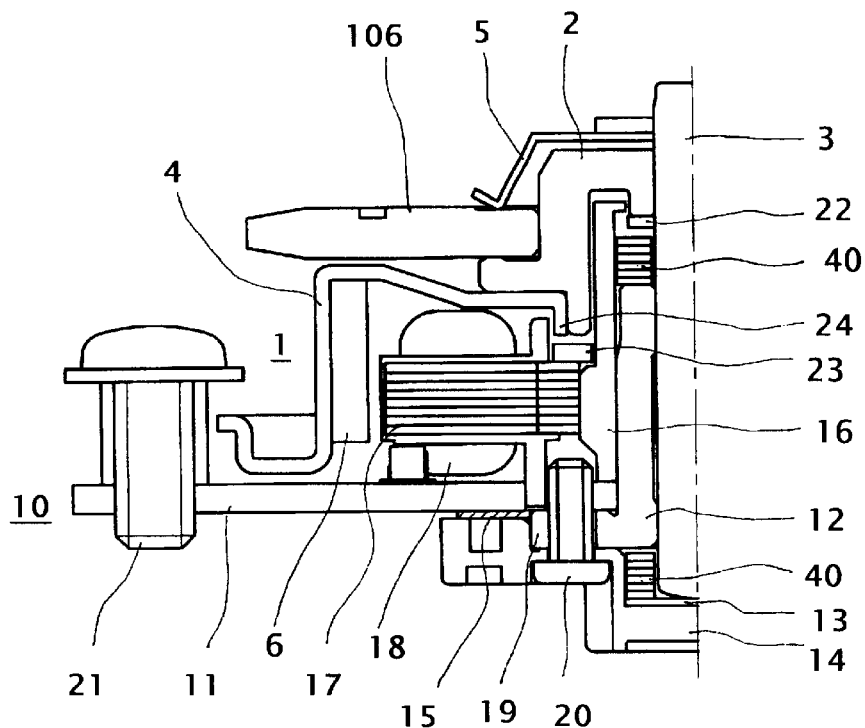
FIG. 4 is a cross sectional view of half-side of a spindle motor in accordance with a first embodiment of the present invention.

FIG. 4 shows a cross sectional view of half-side of a spindle motor in accordance with a first embodiment of the present invention. The cross sectional view of the spindle motor is symmetry to the half-side view. The spindle motor is basically composed of a rotor 1 and a stator 10. The rotor 1 is composed of a bush 2 pressed with a spindle shaft 3, a rotor yoke 4 fixed with the bush 2, the polygon mirror 106, a spring 5 for fixing the mirror 106, a ring magnet 6 fixed at the periphery of the rotor yoke 4.

The stator 10 is composed of a motor base 11, a shaft bearing 12, a thrust plate 13, a thrust cover 14, an oil seal 15, a bearing holder 16, a core 17, and a coil 18. The shaft bearing 12 is made of copper or iron sintered alloy, and has a collar bearing portion 19 which is fixed with motor base 11 by a screw 20. The shaft bearing 12 is attached to the bearing holder 16 and the core 17 is attached to the periphery of the bearing holder 16. The core 17 is made of silicon steel plate and wound with the coil 18.

The spindle shaft 3 is rotatably held by the shaft bearing 12. The bottom side of the spindle shaft 3 is covered by the thrust plate 13 and the thrust cover 14. A ring shaped oil seal 15 made of flexible material is inserted between the periphery of the thrust cover 14 and the motor base 11 to prevent the leakage of lubricating oil described below. A screw 21 holds the rotor yoke 4 stably to the motor base 11. The rotor 1 is rotationally attached to the stator 10.

Figure 1:
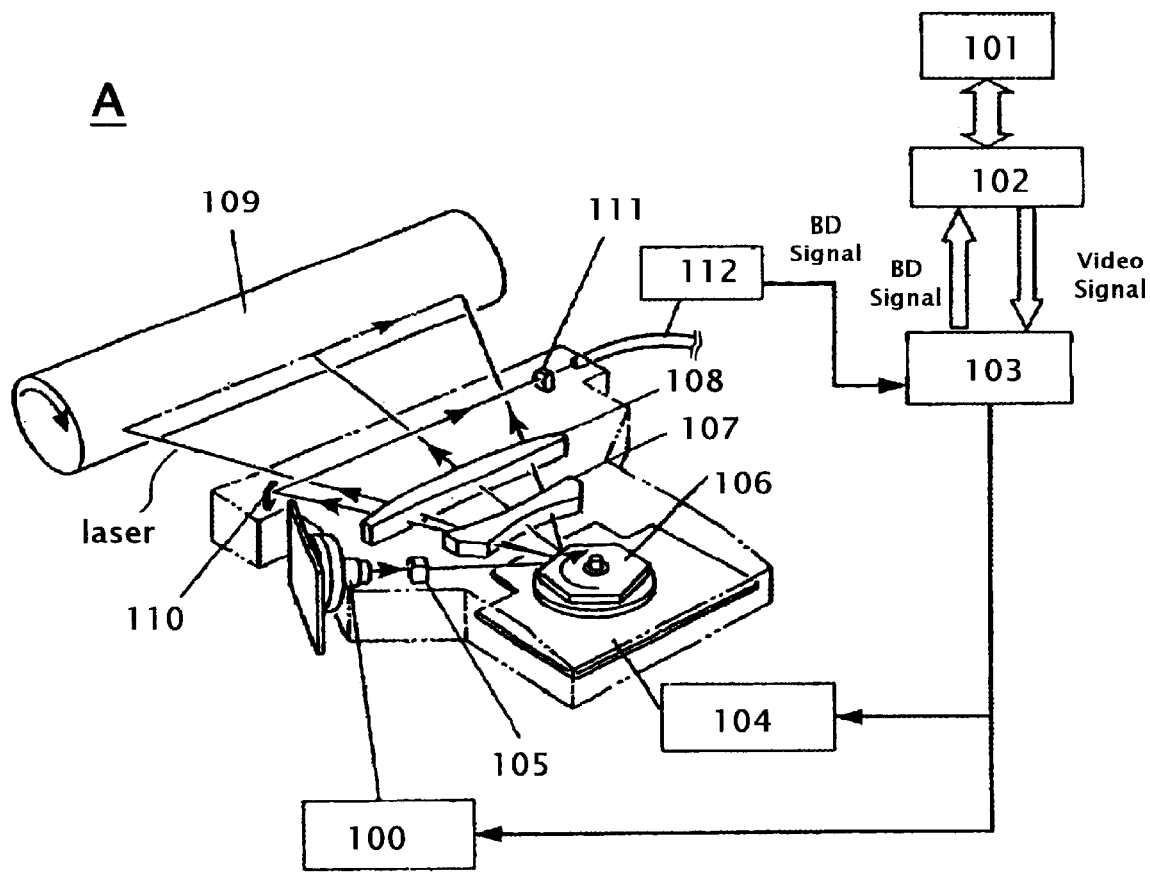
FIG. 1 is a diagram for explaining a structure and operation of a conventional LBP.
Figure 2:
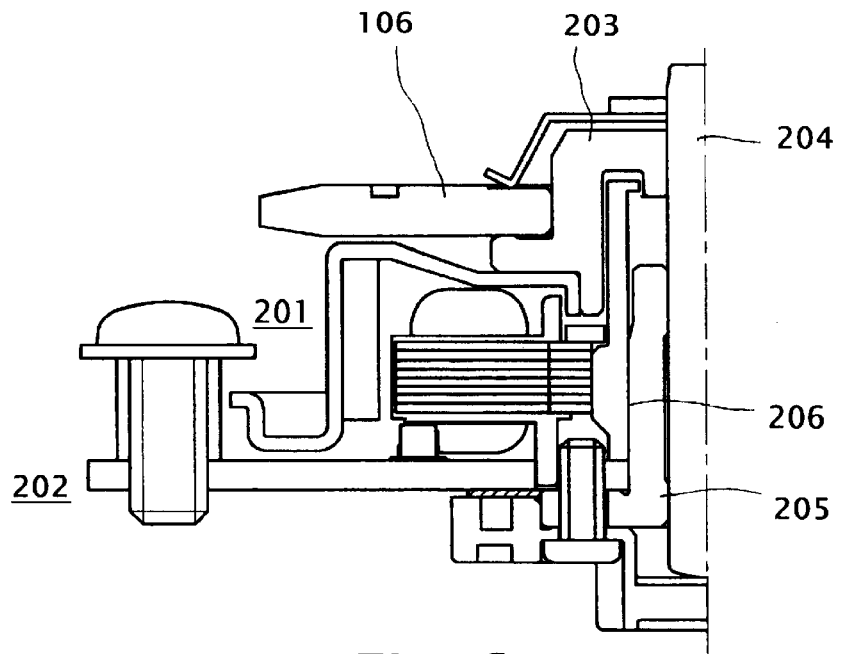
FIG. 2 is a cross sectional view of half-side of a spindle motor in accordance with the related art.
Figure 3:
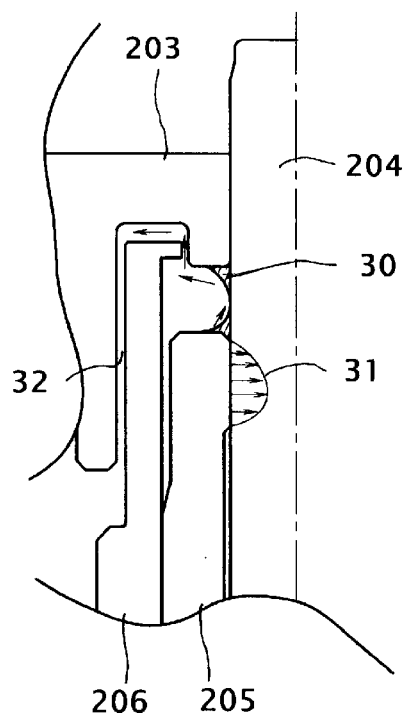
FIG. 3 is a cross sectional view of the spindle motor shown in FIG. 2 partially enlarged.

The mirror 106 is placed on the top of the rotor 1 and fixed with the bush 2 by the spring 5. When an electric current of predetermined value is provided to the coil 18, the rotor 1 starts to rotate with the mirror 106 fixed thereon. The mirror 106 is a polygon mirror having four to six sides. As described above, the rotation of the mirror 106 reflects the laser beam onto the photosensitive unit 109 shown in FIG. 1 for scanning.

The spindle motor is further composed of an oil deflector 22, a bias magnet 23 and an oil cycle material 40. The oil deflector 22 is provided at the bearing portion of the bush 2 to prevent the lubricating oil 34 from leaking out of the bush 2.

The bias magnet 23 is inserted on the periphery of the bearing holder 16 opposing to an inner edge 24 of the rotor yoke 4. In FIG. 4, the oil cycle material 40 is incorporated on the top and also bottom portions of the shaft bearing 12.

Figure 5:
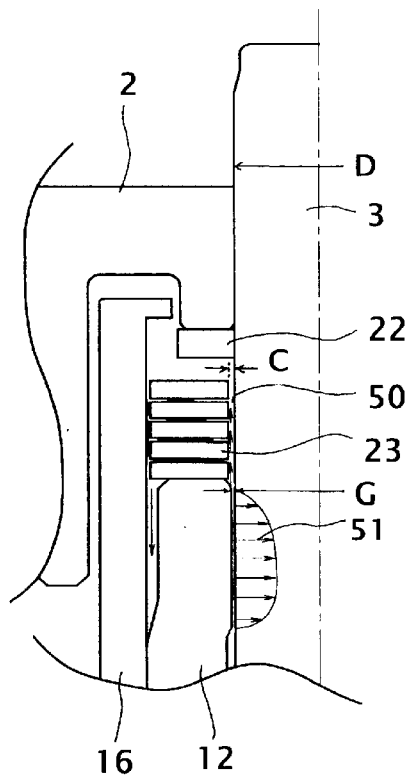
FIG. 5 is a cross sectional enlarged view of the substantial part of the spindle motor shown in FIG. 4.

FIG. 5 is a cross sectional enlarged view of the substantial part of the spindle motor shown in FIG. 4. In FIG. 5, an oil cycle material 40 is placed on the shaft bearing 12 between the bearing holder 16 and the spindle shaft 3. The clearance between the shaft bearing 12 is G, the clearance between the spindle shaft 3 and the oil cycle material 40 is C, the outer diameter of the spindle shaft 3 is D. Lubricating oil 50 is applied to the surface of the spindle shaft 3.

The oil deflector 22 is placed at the bearing portion of the bush 2 to prevent the lubricating oil 50 from leaking out of the bush 2.

Upon the rotation of the rotor 1, the lubricating oil 50 moves to the top and bottom edges of the shaft bearing 12. In the case of this embodiment, the clearance G is 0.003 mm.

The oil cycle material 40 has an internal diameter bigger than that of the shaft bearing 12. The clearance C is bigger than the clearance between the internal diameter of the bearing holder 16 and the outer diameter of the oil cycle material 40.

As set above, the oil 50 lubricates the spindle shaft 3 and the shaft bearing 12. A hydraulic pressure 51 and a surface tension move the lubricating oil 50 along the clearance C. Then the oil 50 moves along the outer diameter of the cycle material 40 towards the shaft bearing 12 so that the oil 50 circulates to lubricate the shaft bearing 12 for rotation of the spindle shaft 3.

The oil cycle material 40 has a donut shaped plate, and a plurality of donut shaped plates with equal thickness are laminated. The material 40 is made of stainless plate having outer diameter 5.96 mm, internal diameter 3.24 mm and thickness 0.3 mm. For example, five plates are laminated.

Figure 6:
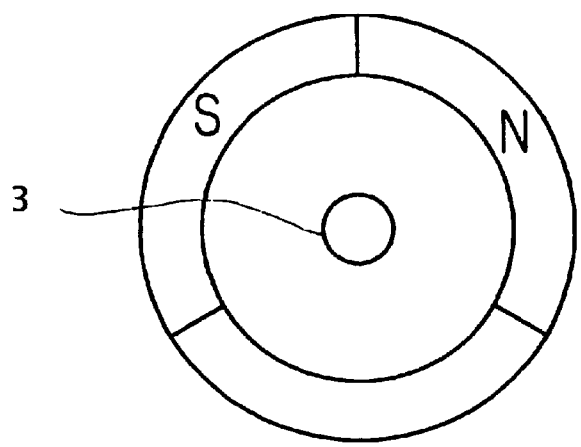
FIGS. 6(A) to 6(C) are plan views of a ring magnet to be inserted between a rotor and a stator.
Figure 6:
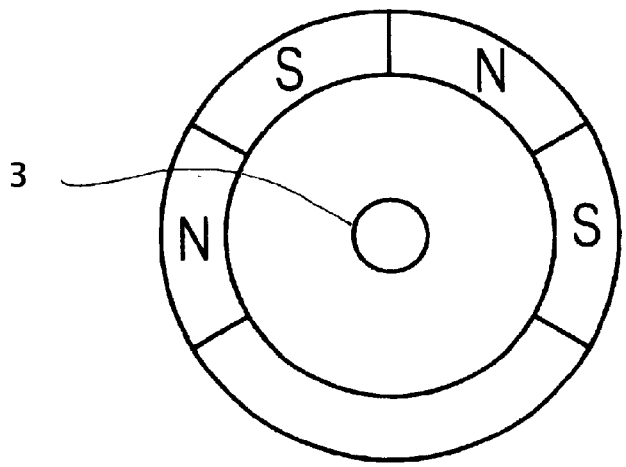
Figure 6:
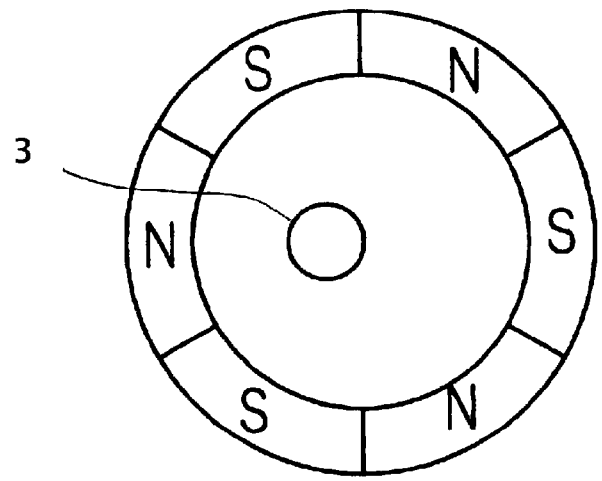

The bias magnet 23 fixed on the core 17 has a ring shape to adjust the wobbling of the rotor yoke 4 and magnetized in various patterns as shown in FIGS. 6(A) to 6(C).

FIGS. 6(A) to 6(C) are plan views of a ring magnet to be inserted between the rotor 1 and the stator 10.

For example, in FIG. 6(A), the bias magnet 23 is divided into three portions where two portions are magnetized in S pole and N pole respectively, and a third portion is not magnetized. Such the bias magnet 23 is opposed to the inner edge 24 of the rotor yoke 4 that the inner edge 24 is attracted by the magnetic force of the bias magnet 23.

As the bias magnet 23 is not magnetized evenly, the rotor 1 is attracted to one side and consequently, the spindle shaft 3 is also attracted to one side in relation to the rotation of the rotor 4.

The clearance between the spindle shaft 3 and the shaft bearing 12 is minimized by the magnetic force of the bias magnet 23 attracting the spindle shaft 3 to one side. In this sense, the vibration caused by oil whirl can be suppressed. The oil whirl is unstable movement of the spindle shaft 3 caused by high-speed rotation of the spindle shaft 3. As the mirror 106 is fixed with the spindle shaft 3, the unstable movement or vibration of the spindle shaft 3 causes the wobbling of the reflection surface of the mirror 106.

The magnetization pattern of the bias magnet 23 can be smaller as shown in FIG. 6(B). The small magnetization pattern makes the attraction of the inner edge 24 stronger.

In addition, the whole bias magnet can be magnetized as shown in FIG. 6(C). In this case, the center portion is moved from the spindle shaft 3 to shift the center of the rotor 1 to an appropriate position by the difference of the attraction force of the bias magnet 23 from side to side.

The reliability of the oil cycle material 40 is explained as follows by reference of FIG. 7 in relation to the clearance C between the inner circumference of the material 40 and the periphery of the spindle shaft 3.

Figure 7:
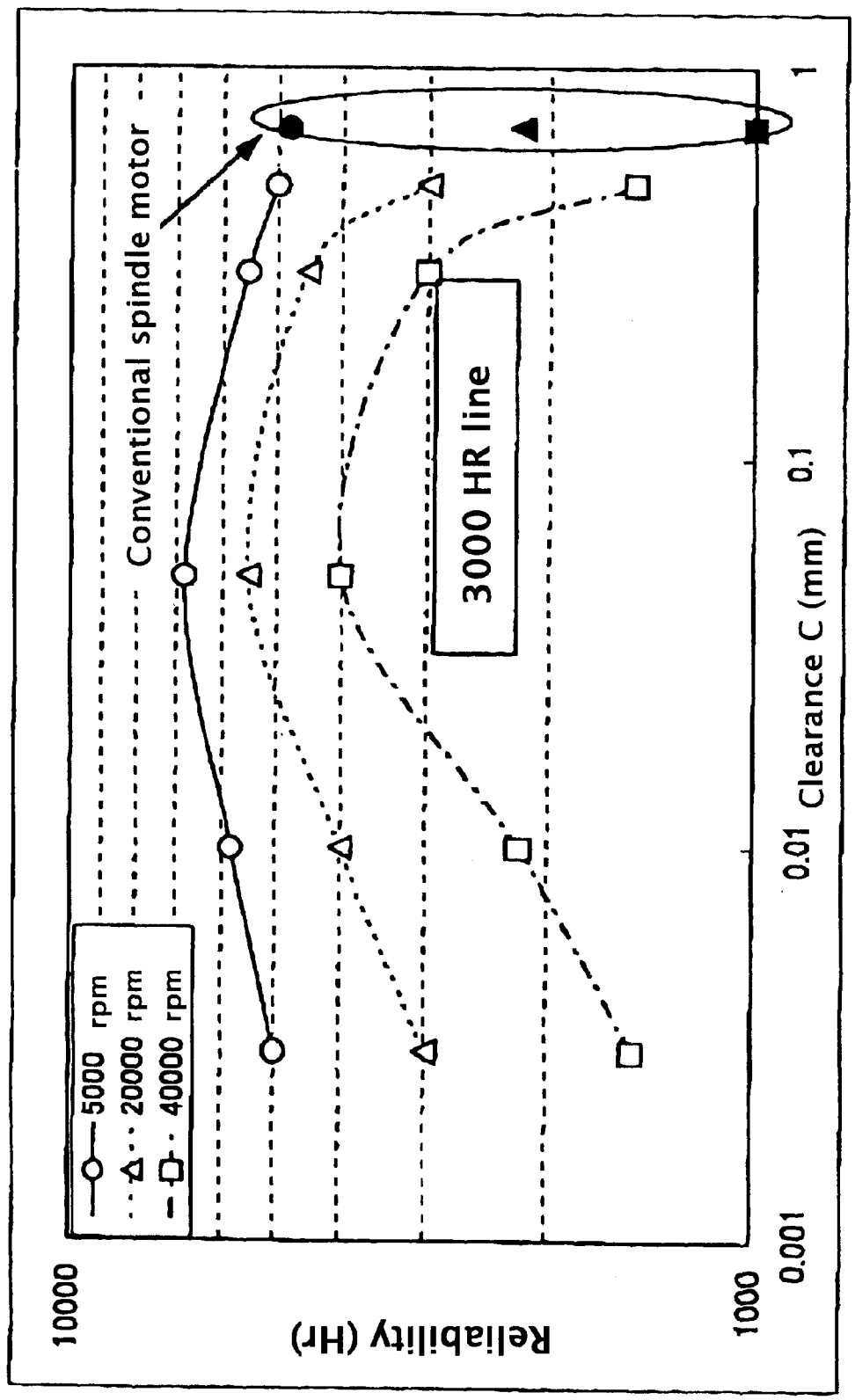
FIG. 7 is a diagram for explaining the relation between the reliability and the clearance of the spindle shaft and the shaft bearing of the spindle motor in accordance with the first embodiment of the present invention.

FIG. 7 shows reliability, that is, life (hour) of the motor in relation to the clearance C in different revolution of the motor. The motor used for this has a donut shaped plate for oil cycle material, and has the spindle of diameter D (which is 3 mm), and has the clearance C between the inner circumference of the oil cycle material and the diameter D.

The revolution of the motor is set to 5,000 rpm, 20,000 rpm and 40,000 rpm respectively. FIG. 7 shows that the reliability of the motor is more influenced by the clearance C as the motor rotates faster.

When the motor rotates at 40,000 rpm, the reliability drops below 3000 hours if the clearance C becomes smaller than 0.03 mm which is centesimal of the diameter D (D/100). This is caused by an outflow of the lubricating oil pushed by the hydraulic pressure of the oil cycle material when the clearance C becomes smaller than 0.03 mm. Consequently, the lubrication is depressed and the reliability is deteriorated.

Similarly, the reliability drops below 3000 hours if the clearance C becomes bigger than 0.3 mm which is tenth part of the diameter D (D/10). This is caused by capillary phenomenon of the lubricating oil that the suction power of the oil is depressed and the reliability is deteriorated.

The spindle motor requires at least 3000 hours of reliability which is preferable for a LBP motor. In this sense, the clearance C should be determined as follows.

$1/100 \leq C/D \leq 1/10$

Accordingly, the lubricating oil 50 flowed along the spindle shaft 3 re-flows to the shaft bearing 12 by the donut plate 40 when the clearance C between the inner circumference of the donut plate 40 and diameter D of the spindle shaft 3 is more than or equal to D/100 and less than or equal to D/10. Therefore, the lubricating oil 50 does not outflow to the outside of the shaft bearing 12.

[Second Embodiment]

Figure 8:
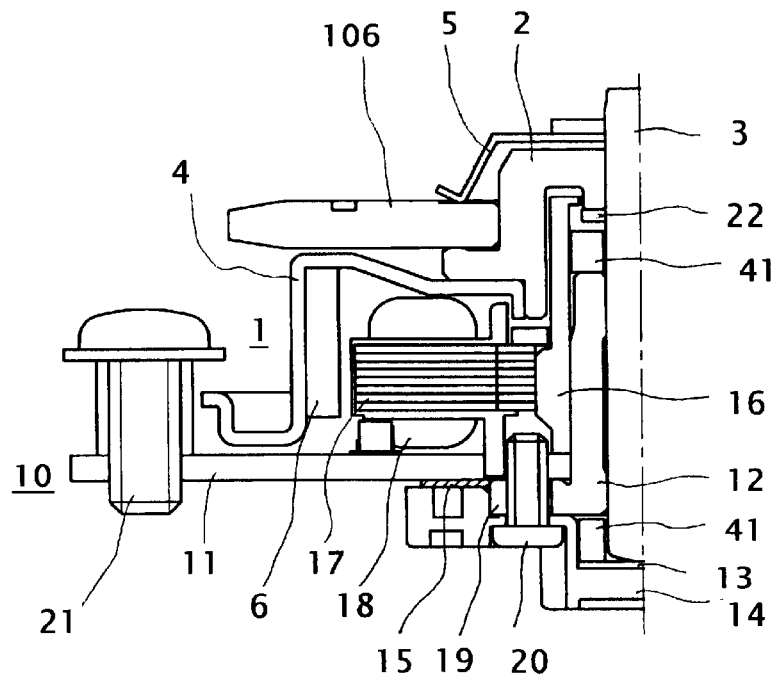
FIG. 8 is a cross sectional view of half-side of the spindle motor in accordance with a second embodiment of the present invention.

FIG. 8 is a cross-sectional view of the spindle motor in accordance with a second embodiment of the present invention. The spindle motor shown in FIG. 8 is identical to the spindle motor shown in FIG. 4 except for a ring plate 41 substituted from the oil cycle material 40.

The ring plate 41 is made of leachy sintered metal. The inner circumference of the ring plate 41 is bigger than the inner circumference of the spindle shaft 3. The periphery of the ring plate 41 is held by the inner periphery of the bearing holder 16.

The ring plate 41 may be impregnated with the lubricating oil which increases the amount of the lubricating oil in the bearing shaft and extends the lubrication of the bearing shaft.

Figure 9:
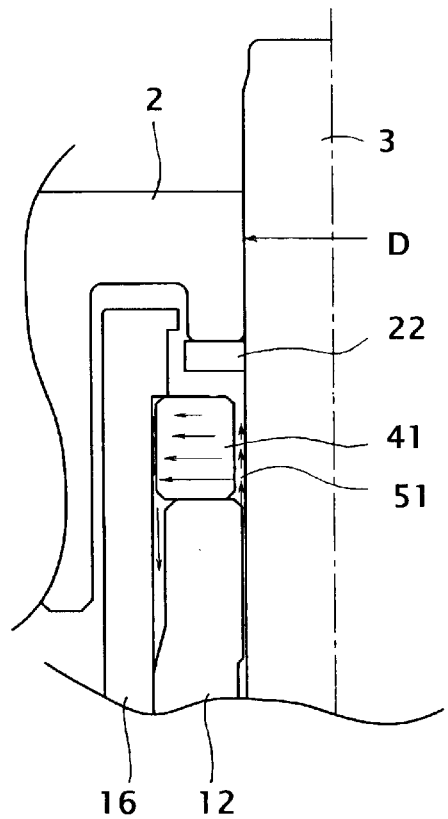
FIG. 9 is a cross sectional enlarged view of the substantial part of the spindle motor shown in FIG. 8.

FIG. 9 is a cross sectional enlarged view of the substantial part of the spindle motor shown in FIG. 8. In FIG. 9, the ring plate 41 has an internal diameter bigger than that of the shaft bearing 12. The clearance between the ring plate 41 and the diameter D of the spindle shaft is bigger than the clearance between the internal diameter of the bearing holder 16 and the outer diameter of the oil cycle material 41.

As set above, the oil applied to the surface of spindle shaft 3 lubricates the spindle shaft 3 and the shaft bearing 12. A hydraulic pressure 51 and a surface tension move the lubricating oil along the clearance between the spindle shaft 3 and the oil cycle material 41. Then the oil moves along the outer diameter of the ring plate 41 towards the shaft bearing 12 so that the oil circulates and lubricates the shaft bearing 12 for rotation of the spindle shaft 3.

Figure 10:
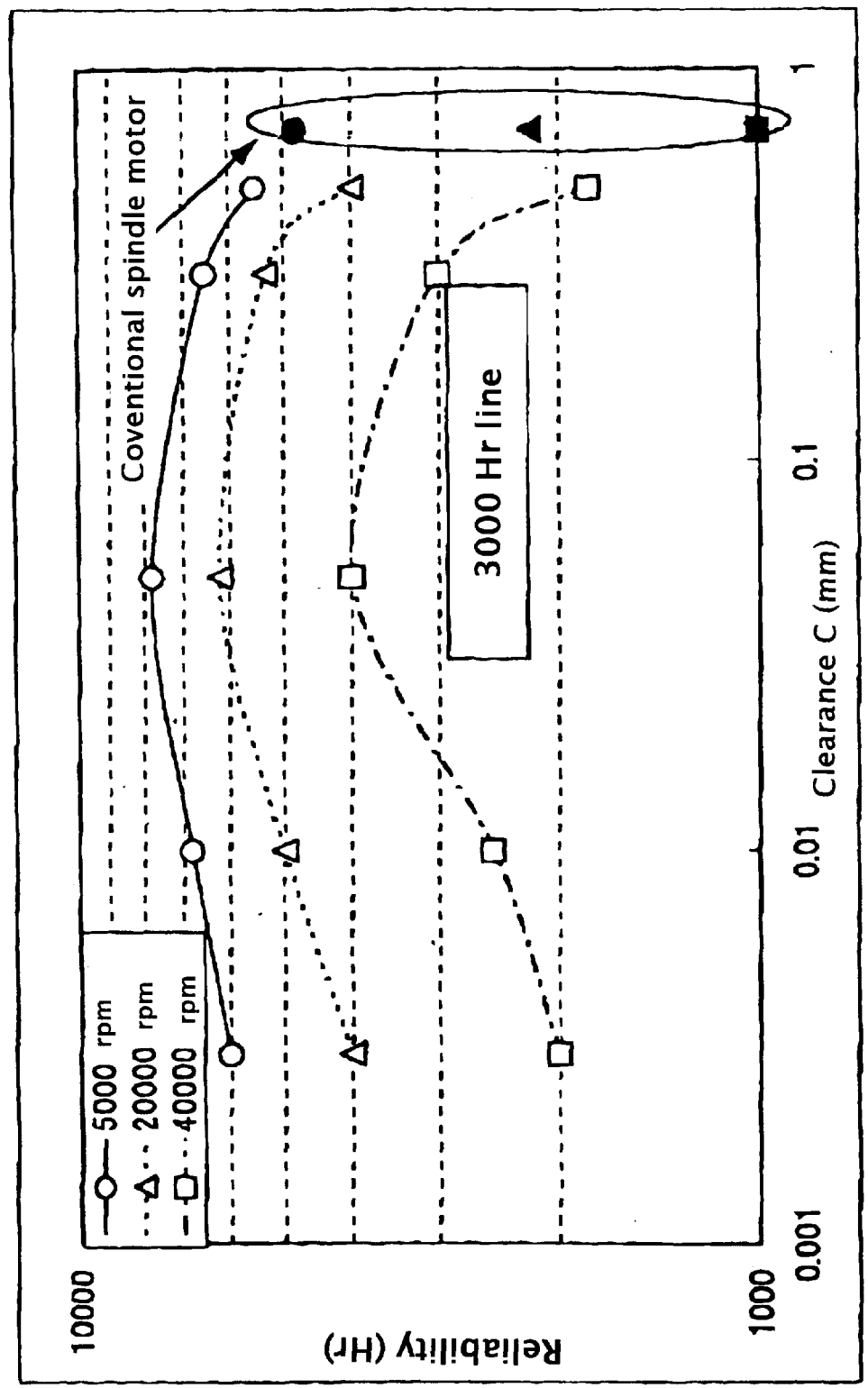
FIG. 10 is a diagram for explaining the relation between the reliability and the clearance of the spindle shaft and the shaft bearing of the spindle motor in accordance with the second embodiment of the present invention.

FIG. 10 shows reliability, life (hour) of the motor in relation to clearance C in different revolution of the motor. The motor used for this has the ring plate 41 for oil cycle material, and has the spindle shaft of diameter D (which is 3 mm), and has the clearance C between the inner circumference of the oil cycle material and the diameter D.

As shown in FIG. 10, the clearance C between the inner circumference of the ring plate 41 and the diameter D of the spindle will be determined as follows.

$1/100 \leq C/D \leq 1/10$

Consequently, the reliability of the motor can be extensively improved by setting the clearance C within the above range.

As described above, the spindle motor in accordance with the present invention provides the oil cycle material having a donut shaped plate which sucks in the lubricating oil flowing out from the bearing shaft by capillary phenomenon. Further, the lubricating oil can re-flow from the gap in the periphery of the donut shaped plate and the inner circumference of the bearing holder, so that the oil is prevented from flowing out from the bearing shaft. As the lubricating oil is circulated in the bearing shaft to prevent the spindle of the motor from burned and stuck, and the reliability of the motor will extensively improved.

Further, as described above, the present invention provides the oil cycle material having donut shaped flat washer, that the lubricating oil is retained in the gap of the flat washer, and the oil is prevented from leaking out from the bearing shaft even the motor rotates in high speed.

Furthermore, as described above, the present invention provides the oil cycle material which is made of leachy sintered alloy and formed in a ring shape, the lubricating oil is prevented from leaking out from the bearing shaft. Consequently, the reliability of the motor will be extensively improved.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

What is claimed is:

1. A shaft bearing structure of spindle motor holding:
   a rotor rotationally attached to a shaft bearing a bearing holder fixed on a motor base of a stator, wherein the rotor is fixed with a spindle shaft and confronted with the stator,
   the shaft bearing structure is characterized in that an oil cycle material retains and re-flows lubricating oil circulating around the spindle shaft in the shaft bearing, wherein the oil cycle material is placed in the gap between the inner circumference of the bearing holder and the periphery of the spindle shaft, and placed at least contiguous to one edge of the shaft bearing in axial direction of the spindle shaft.

2. The shaft bearing structure as claimed in claim 1, wherein a plurality of ring shaped oil cycle materials is laminated on the shaft bearing.

3. The shaft bearing structure as claimed in claim 1, wherein a clearance C between the inner circumference of the oil cycle material and the diameter D of the spindle shaft is determined in the range of;

$1/100 \leq C/D 1/10$.

* * * * *